UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

FINISH-REMOVER.

BEST AVAILABLE COPY

1,000,388.  Specification of Letters Patent.  Patented Aug. 15, 1911.

No Drawing.  Application filed May 27, 1907.  Serial No. 375,901.

*To all whom it may concern:*

Be it known that I, CARLETON ELLIS, a citizen of the United States, and now residing at Larchmont, in the county of Westchester and State of New York, have made certain new and useful Inventions Relating to Finish-Removers, of which the following is a specification.

This invention relates to finish removers and relates especially to removers comprising cyclic hydrocarbons containing $CH_2$ groups and to the immediate derivatives of such hydrocarbons, including their alcoholic, ketonic, aldehydic or acetic derivatives.

Many of the cyclic $CH_2$ hydrocarbons and their derivatives are valuable as finish solvents in removers such as the cyclic paraffins, including cyclopentane or pentamethylene, vinyl trimethylene, suberone or cycloheptane, hexahydro benzenes or naphthenes embracing hexahydrobenzol, hexahydrotoluol and the like. Many immediate derivatives of these cyclic paraffins or cyclic hydrocarbons are also desirable finish solvents, such, for example, as acetyltrimethylene, ditetramethylene ketone, adipin ketone (ketopentamethylene), methyl cyclopentenon, cyclopentane carboxylic acids, suberone, cyclohexanol, pimelin ketone, hexahydrometatoluic acid and similar carboxylic acids of the hydroaromatic group and other oxygenated or halogenated bodies thereof. Penetrating finish solvent material, that is, solvents having a generally benzolic character or action in removers may be used in such removers, including benzol, toluol, xylol, cumene, the somewhat similar petroleum products, benzin, gasolene, and so forth, and also carbon-bisulfid, carbon-tetrachlorid, acetylene chlorid and other chlorinated compounds. Loosening finish solvent material, that is, solvents having a generally alcoholic character or action in removers may also be used in the remover when desired, such as the strict alcohols, methyl, ethyl, propyl, butyl and benzyl alcohols, for instance, in their cheaper commercial forms when desired, including denatured alcohol and also other solvents of a generally alcoholic character, such as methyl acetone, acetone, and other ketones, acetone oil, resin oil and so forth, as well as various derivatives thereof, such as amyl acetate. Although not necessary in all cases, suitable stiffening material may be employed in the remover, such as wood flour, starch, whiting, infusorial earth, magnesia and soapy or waxy bodies, such as ceresin, paraffin, beeswax, ozocerite, oleic and other fatty acids, and nitrocellulose, many of which form effective evaporation retarding films over the exposed surface of the remover when in use. The various ingredients of the remover are preferably thoroughly incorporated by agitation at a suitable gentle heat, the stiffening material when of a soapy or waxy character being preferably first dissolved in the more energetic solvent material therefor, although this is not necessary in all cases.

A suitable illustrative remover of this type may comprise benzol 12 gallons, commercial hexahydrobenzene 27 gallons, commercial adipin ketone 43 gallons, wood flour 50 pounds and paraffin or ceresin wax 30 pounds. Another illustrative remover may comprise light naphthene oil 40 gallons, adipin ketone 60 gallons and suberone 5 gallons. Another illustrative remover may comprise naphthene oil 50 gallons and adipin ketone 45 gallons; and still another illustrative remover may comprise hexahydrobenzene which may be in its commercial form 50 gallons, acetone 25 gallons and paraffin or ceresin wax 10 pounds.

Having described this invention in connection with a number of illustrative ingredients and formulas, to the details of which disclosure it is not, of course, to be limited, what is claimed is:

1. The finish remover comprising approximately benzol 12 gallons, commercial hexahydrobenzene 27 gallons, commercial adipin ketone 43 gallons, wood flour 50 pounds and paraffin wax 30 pounds.

2. The finish remover comprising approximately benzol, commercial hexahydrobenzene 27 gallons, adipin ketone 43 gallons and waxy stiffening material.

3. The finish remover comprising hexahydrobenzene, adipin ketone and stiffening material.

4. The finish remover comprising adipin ketone and stiffening material.

5. The finish remover comprising composite finish solvent material including adipin ketone.

6. The finish remover comprising composite finish solvent material including hexahydrobenzene and adipin ketone.

7. The finish remover comprising composite finish solvent material including a liquid, finish solvent, ketonic derivative of a cyclic $CH_2$ hydrocarbon.

8. The finish remover comprising a composite solvent material including a liquid, finish solvent, ketonic derivative of a cyclic $CH_2$ hydrocarbon and waxy stiffening material.

9. The finish remover comprising a composite finish solvent material including a liquid, finish solvent, ketonic derivative of a cyclic $CH_2$ hydrocarbon.

10. The finish remover comprising a composite solvent material including a liquid, finish solvent, oxygenated cylic $CH_2$ hydrocarbon.

11. The finish remover comprising composite finish solvent material including a liquid, finish solvent, ketonic derivative of a cyclic $CH_2$ hydrocarbon and miscible solvent material of a generally penetrating and loosening character.

12. The finish remover consisting substantially of composite volatile finish solvent material including finish solvent liquid ketonic derivatives of cyclic $CH_2$ hydrocarbons.

13. The finish remover comprising hexahydrobenzene and miscible loosening finish solvent.

14. The finish remover comprising hexahydrobenzene, miscible finish solvent material and stiffening material.

15. The finish remover comprising liquid ketonic cyclic $CH_2$ hydrocarbon finish solvent and loosening finish solvent material.

16. The finish remover comprising cyclic $CH_2$ hydrocarbon finish solvent material and adipin ketone.

CARLETON ELLIS.

Witnesses:
HARRY L. DUNCAN,
JESSIE B. KAY.